Jan. 23, 1923.
D. J. MacMILLAN.
PNEUMATIC DISPATCH TUBE CARRIER.
FILED SEPT. 6, 1921.
1,443,232.
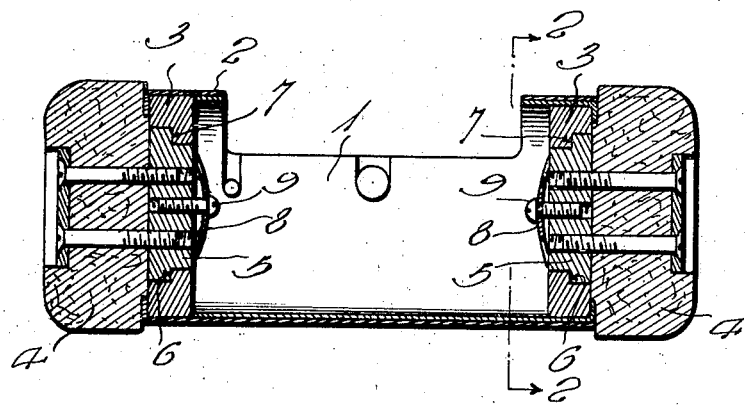
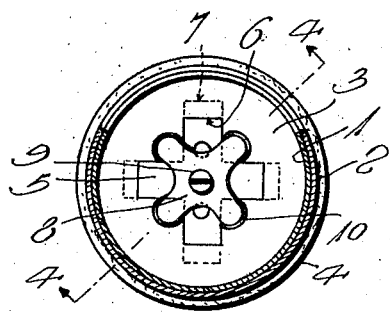
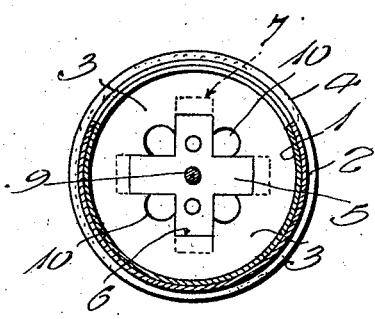
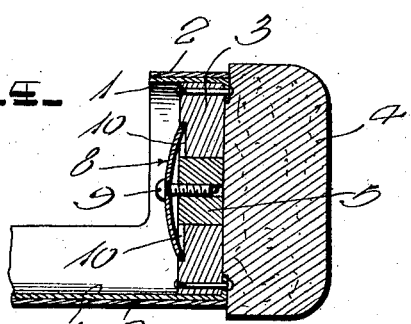
Inventor
D. J. MacMILLAN
Witness
H. Woodard
By
Attorneys Patented Jan. 23, 1923.

1,443,232

UNITED STATES PATENT OFFICE.

DANIEL J. MacMILLAN, OF BROOKLYN, NEW YORK.

PNEUMATIC-DISPATCH-TUBE CARRIER.

Application filed September 6, 1921. Serial No. 498,599.

*To all whom it may concern:*

Be it known that I, DANIEL J. MACMILLAN, a citizen of the United States, residing at Brooklyn, in the county of Kings and State of New York, have invented certain new and useful Improvements in Pneumatic-Dispatch-Tube Carriers, and do declare the following to be a full, clear, and exact description of the invention, such as will enable others skilled in the art to which it appertains to make and use the same.

This invention relates to an improved pneumatic dispatch tube or carrier such as is used in department stores and the like and it relates more specifically to an improved bumper for use in connection with such devices.

Carriers of this class now commonly used and marketed are made up of inner and outer telescopically connected relatively movable tubes having registered openings through which the money or dispatch is inserted and removed, these tubes having bumpers arranged at their opposite ends and detachably connected with the tubes. Small bolts and nuts are employed for connecting the bumpers in place and when the latter become excessively worn and must necessarily be replaced by new ones, as is a frequent occurrence, considerable difficulty is experienced. It is therefore the principal aim of this invention to devise means for connecting the bumpers to the tubes of the carrier which is such in construction that it will enable the bumpers to be quickly removed and replaced with new ones, and will hold them against rotation with respect to the tubes.

Another object of the invention is to devise an extremely simple construction for carrying out the above end, it being such that it permits the usual bolts and nuts to be entirely dispensed with, and consisting merely of means for non-rotatably connecting the bumpers in place, and of simple rotary catches or locking devices which can be easily and readily released to permit removal and replacement of the bumpers.

Other objects and advantages of the invention will be apparent during the course of the following description.

In the accompanying drawings forming a part of this specification and in which like numerals are employed to designate like parts throughout the same:

Figure 1 is a central longitudinal sectional view through a dispatch carrying tube constructed in accordance with this invention.

Figure 2 is a transverse sectional view taken substantially on the plane of the line 2—2 of Fig. 1.

Figure 3 is a view like Figure 2 showing the catch removed.

Figure 4 is a detail section taken substantially on the plane of the line 4—4 of Fig. 2.

As commonly constructed, devices of this class comprise, as before briefly indicated, telescopically connected tubes which are formed with openings to be registered to permit the money or other dispatch to be carried, to be inserted into the same. The inner tube is closed at one end while the remaining tube is open at this end, but closed at its opposite end and to these closed ends, the usual felt bumpers or packing heads are bolted or otherwise detachably connected. These bumpers are subjected to excessive wear, and must frequently be replaced and as before set forth, considerable difficulty is experienced in replacing them with the type of fastenings or connections now employed. It is to be stated here that although the improved bumpers are shown attached to a carrier of the above type it is of course understood that they need not be restricted to the showing, and can be used with other types of carriers.

Referring to the drawings by numerals, 1 and 2 designate the inner and outer telescopically connected tubes respectively. The first named tube instead of being entirely closed at the right-hand end has a portion of this closed end cut out, a circular casting 3 being soldered or otherwise secured to the unremoved part of the closed end as clearly illustrated. The outer tube at the opposite end is likewise constructed. The felt heads 4 which can be conveniently termed bumpers or packing members are non-rotatably connected with the casting 3 by novel means. While this means may be constructed otherwise, it preferably consists of a pair of heads 5 of cross-formation which are bolted or otherwise secured to the inner faces of the bumpers 4. It is to be stated here that as both castings 3 are formed at their centers with openings of cross-formation and the arms of the heads 5 extend into these openings and thus serve to prevent rotation of the bumpers with respect to the castings. The bumpers may therefore be used as handgrips for rotating the tubes with respect to one another. It may be conveniently pointed out here that the ends of the arms of the cross member 5 are notched as indicated at 6 and the reduced ends permitted to serve as stops which are received in the notches 7 formed in the outer faces of the parts 3. As previously indicated, spring catches are employed for the purpose of providing a quick detachable connection for the bumpers, these catches being indicated by the numerals 8. While they could be constructed otherwise, an examination of Figure 2 will disclose the fact that they are likewise constructed in the form of a cross and are rotatably and detachably connected with the aforesaid heads or cross members 5 by means of small bolts 9. These catches are formed of resilient metal and are bowed as clearly shown in Figure 1 and when it is desired to hold the bumpers in place, the arms thereof are positioned between the arms of the member 5 and are received in recesses 10 formed in the inner faces of the castings 3. The tension or pressure exerted by the catches can be varied by adjusting the bolts 9. With this arrangement it is obvious that in order to remove the bumpers, it is only necessary to engage one of the arms of the catches by a suitable instrument and rotate the catch until the arms thereof are positioned directly over the arms of the cross members 5. With the parts in this position it will be seen that the catches and cross-members will be in such a position as to permit the cross-members to be withdrawn from the cross shaped openings in the castings. It may be conveniently set forth here that the resiliency of the catches tends to draw the cross members 5 through the cross-shaped openings in the castings, but by reducing the ends of the arms of the members 5 to provide the aforesaid stops and permitting these stops to extend into the notches 7 in the outer faces of the casting 3, these members 5 are prevented from being drawn through the openings as might otherwise occur.

The manner of removing and replacing the bumpers has doubtless been made clear by the foregoing description. However, a brief review of the operation of the device may well be inserted here. To this end, it is to be stated that to remove one of the bumpers, simply engage a suitable instrument with one of the arms of the cross shaped catches 8 and rotate the catch or catches until the arms thereof are positioned directly over the arms of the cross members 5. Then, the cross member 5 can be withdrawn from the correspondingly shaped opening of the casting 3 and the bumper thus removed. The new bumper can be placed in position by simply reversing the operation.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. A dispatch carrier comprising a body, heads arranged at the opposite ends thereof, means for non-rotatably engaging said heads with the opposite ends of said body, and separate and independent retaining means for the heads, said means permitting quick attachment and detachment of the latter.

2. A dispatch carrier comprising a body, closed at its opposite ends, said closed ends being formed with non-circular openings, bumpers, non-circular projections on the inner faces of the bumpers extending into said non-circular openings, and catches carried by said projections, said catches being engageable with the closed ends for holding the bumpers in position but permitting quick application and removal thereof.

3. A dispatch carrier comprising a body closed at its outer ends, said ends being formed with openings of cross formation, a pair of bumpers arranged at the outer ends of the body, cross-members secured to the inner faces of the bumpers and extending into the aforesaid openings, and cross-shaped rotary latches carried by said member, the arms thereof being disposed between the arms of said member and being engaged with the closed ends of the tubes for maintaining the bumpers in place and permitting quick removal and application thereof.

4. A bumper for pneumatic dispatch carrier provided on its inner face with means for non-rotatably engaging it with the carrier, and a rotary retaining device carried by said means.

5. A bumper for pneumatic dispatch carriers provided on its inner face with a non-circular projection, and a rotary locking device carried by the latter.

6. A bumper for dispatch carriers comprising a body having a substantially cross-shaped projection on its inner face, and a similarly shaped latch rotatably connected to said projection.

7. A bumper for pneumatic dispatch tube carriers having a portion to extend through an opening formed in one end of the carrier to prevent relative rotation with respect to the latter, and a movable retaining device associated with said portion and engaging the end of the carrier to retain the bumper in place, said retaining device being moved to clear the edge of the opening to permit removal of the bumper.

8. A bumper for use on pneumatic dispatch tube carriers having a projection on its inner face to extend through an opening formed in one end of the carrier, and a rotary locking device connected to said projection and engageable with the end of said carrier, said locking device being movable to a position to clear the edge of the opening to permit withdrawal of the projection therefrom, whereby to permit rapid disconnection of the bumper.

In testimony whereof I have hereunto set my hand.

DANIEL J. MacMILLAN.